(12) United States Patent
Manjunath et al.

(10) Patent No.: US 9,256,608 B2
(45) Date of Patent: Feb. 9, 2016

(54) MAPPING USER CONTENT TO FOLDERS IN A FILE SYSTEM

(75) Inventors: Geetha Manjunath, Karnataka (IN); Ajay Gupta, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1342 days.

(21) Appl. No.: 12/720,689

(22) Filed: Mar. 10, 2010

(65) Prior Publication Data

US 2011/0113035 A1    May 12, 2011

(30) Foreign Application Priority Data

Nov. 12, 2009 (IN) .......................... 2780/CHE/2009

(51) Int. Cl.
*G06F 17/30* (2006.01)

(52) U.S. Cl.
CPC .............................. *G06F 17/30115* (2013.01)

(58) Field of Classification Search
None
See application file for complete search history.

(56) References Cited

U.S. PATENT DOCUMENTS

| | | | | |
|---|---|---|---|---|
| 5,835,087 | A * | 11/1998 | Herz et al. ..................... | 715/810 |
| 7,783,668 | B2 * | 8/2010 | Vogel et al. ................... | 707/791 |
| 7,908,273 | B2 * | 3/2011 | DiMaria et al. ............... | 707/736 |
| 2009/0030957 | A1 | 1/2009 | Manjunath | |
| 2010/0030734 | A1 * | 2/2010 | Chunilal .......................... | 707/3 |

* cited by examiner

Primary Examiner — Polina Peach
(74) Attorney, Agent, or Firm — Hewlett-Packard Patent Department

(57) ABSTRACT

Embodiments of the present invention provide a computer system, comprising a personal file system module for determining a file system folder structure based upon a user profile and mapping user content stored on one or more storage devices to one or more folders of the file system.

12 Claims, 4 Drawing Sheets

MAPPING USER CONTENT TO FOLDERS IN A FILE SYSTEM

RELATED APPLICATIONS

Benefit is claimed under 35 U.S.C. 119(a)-(d) to Foreign application Serial No. 2780/CHE/2009 entitled "File System" by Hewlett-Packard Development Company, L.P., filed on 12 Nov. 2009, which is herein incorporated in its entirety by reference for all purposes.

BACKGROUND

Modern electronic devices, such as computers, portable electronic devices etc., have ever increasing storage capabilities. The storage capability can be provided by local storage devices and also by remote storage devices accessible over a wired or wireless network, such as a LAN or the Internet. The capacity of these local and remote storage devices is continually increasing, thereby allowing users to store increasing amounts of user content, such as increasing numbers of documents. Managing the storage of user content is increasingly difficult.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention ease a management burden of user content storage. Embodiments of the invention provide an apparatus and method for storage organisation which facilitates convenient user content storage. Furthermore, some embodiments of the invention ease a burden of sharing user content amongst a plurality of users.

Figure 1:
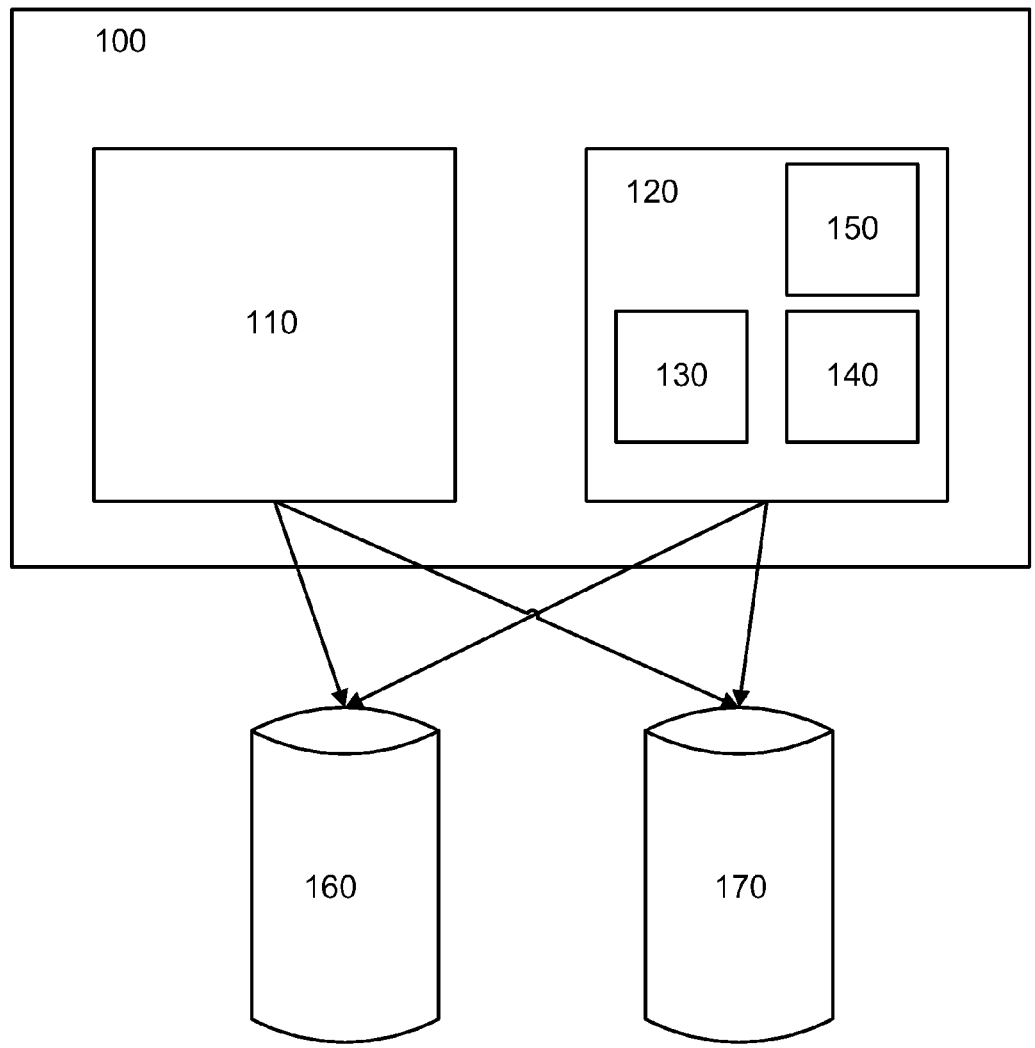
FIG. 1 is a schematic illustration of a file system according to an embodiment of the invention.

FIG. 1 illustrates a virtual file system 100 according to an embodiment of the invention. The virtual file system 100 may be referred to as a self-organising personal file system 100 since a folder or directory structure of the file system is automatically created for a user based upon a user profile. Furthermore, some embodiments of the file system 100 may continually or periodically adapt the folder structure according to the user's changing interests or knowledge, as will be explained.

The file system 100 includes a WebDAV (Web-based Distributed Authoring and Versioning) server 110 and a personal file system (PFS) module 120.

The WebDAV server 110 supports Web-based remote editing and management of files by WebDAV compatible clients. However it will be realised that embodiments of the invention may be envisaged which do not provide WebDAV support, wherein the file system 100 is only locally accessible. The WebDAV server 110 allows WebDAV clients (not shown) to access the file system 100 and, for example, access, create, change and/or move documents.

The PFS module 120 provides file system metadata to the WebDAV server 110. The file system metadata indicates a folder structure of the file system 100 and user content associated with each folder. The PFS module 120 comprises a user profiling component 130 which creates the user profile by analysing user content, as will be explained. The PFS module 120 further comprises a document mapping component 140 which maps user content, such as stored documents, to folders identified in the file system metadata, and a file system sharing component 150 which allows user content to be shared amongst a plurality of users by integrating folder structures of a plurality of users, for example integrating a file structure of one user with that of another user.

The WebDAV server 110 and PFS module 120 are able to access one or more storage devices 160, 170. The storage devices 160, 170 may be local to a computer supporting the file system 100, remotely accessible i.e. via a network connection, or a combination of locally and remotely accessible. The WebDAV server 110 accesses the storage devices 160, 170 to access user content stored therein and the PFS module 120 access the storage devices 160, 170 to determine or update the folder structure and mapping of user content associated with each folder.

The file system 100 may appear as a drive on a computer supporting the file system. For example, a desktop environment of the computer system may contain an icon representing the drive, through which the user may obtain, for example, a graphical representation of a root directory of the file system 100 and navigate through the folder structure to obtain access to user content.

Figure 2:
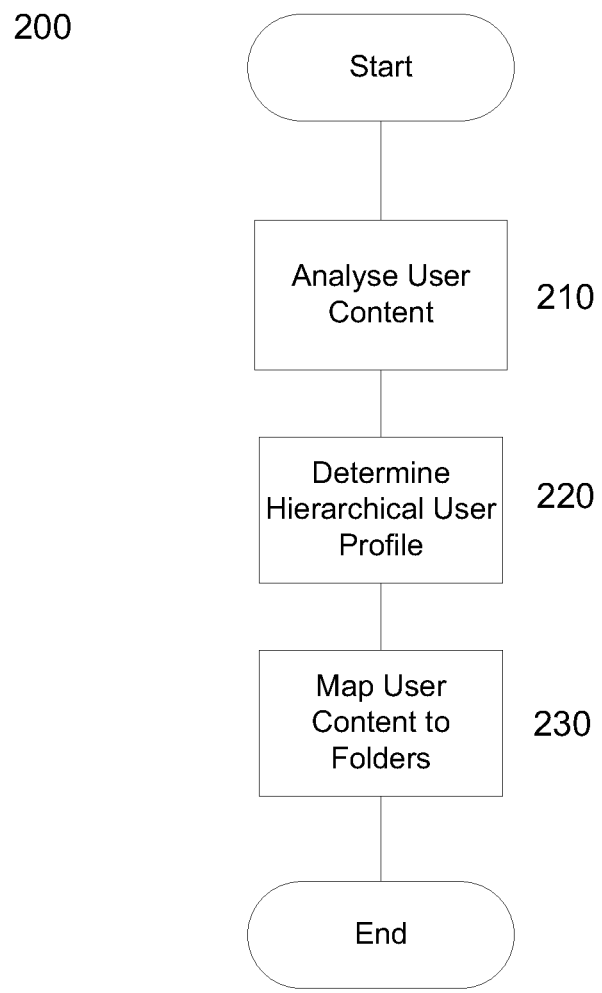
FIG. 2 illustrates a method according to an embodiment of the invention.

FIG. 2 illustrates a method 200 of creating the folder structure of the file system 100 according to an embodiment of the invention.

The method 200 comprises a step 210 of analysing user content to create the user profile which has a hierarchical structure. Step 210 may be performed by the user profiling component 130 shown in FIG. 1. In step 210 user content such as one or more of a web-browsing history (the history of web pages visited by the user), documents stored on one or more of the storage devices 160, 170, bookmarks (stored links to web pages) and/or emails may be analysed to determined the hierarchical user profile. In particular, the analysis aims to determine one or more topics associated with each item of user content e.g. with each document. The topics associated with each item of user content represent the semantic content of, for example, the document. In some embodiments of the invention, the topics associated with each item of user content are determined with respect to a reference set of topics. The reference set of topics may be obtained from an on-line source, such as an on-line encyclopaedia or knowledge repository.

Step 210 will now be further explained with reference to determining topics associated with a document using Wikipedia (www.wikipedia.org), although it will be realised that topics associated with other types of user content may be determined and that other sources e.g. other sources of reference topics, such as encyclopaedias or knowledge repositories, may be used.

Wikipedia comprises over 3 million articles in English alone and may be used as a source of a reference set of topics. In order to determine the reference set of topics, the content of the Wikipedia encyclopaedia may be downloaded (http://en.wikipedia.org/wiki/Wikipedia_database) and parsed. Predetermined articles may then be removed, such as those describing Wikipedia features, template articles, redirects, and articles including less than a predetermined number e.g. 50 non "stop words". An index of the remaining articles may then be created, for example using an index tool such as Lucene which is available from http://lucene.apache.org/. In order to determine the topics associated with a document, a portion of the document is used as a query to the index of articles to determine a predetermined number of best-matching articles in the index. For example, the best-matching 100 articles may be obtained from the index. Terms appearing in the titles of the best-matching articles may then be associated with the document as topics.

In step 220 the one or more topics associated with each item of user content are then used to form the hierarchical user profile. If D represents all the items of user content with which topics have been associated, then D(t) represents all of the items of user content associated with a term t and |D(t)| represents the number of documents associated with the term t. A topic is determined to be frequent if |D(t)| is greater than a predetermined threshold. Each frequent topic is included in the user profile. The hierarchy of the user profile may be determined according to heuristic rules. Similar terms may be determined as covering document sets with a large degree of overlap. If $t_A$ and $t_B$ are two terms, their similarity may be determined as:

$$Sim(t_A, t_B) = \frac{|D(t_A) \cap D(t_B)|}{|D(t_A) \cup D(t_B)|}$$

If $Sim(t_A, t_B) > \delta$ where $\delta$ is a predetermined threshold value, the terms $t_A$ and $t_B$ are determined to be similar. It will realised that other methods for determining similarity may be used.

Parent and child topics may be determined on the basis that specific terms often appear together with general terms, but the reverse is not true. Thus, $t_A$ is taken as a child term of $t_B$ if the condition probability $P(t_A|t_B) > \delta$ where $\delta$ is the same threshold value as before. The term $t_B$ representing the same or similar interest as $t_A$ or as a child interest of $t_B$ may be regarded as a supporting term of $t_A$.

The user profile may be periodically updated to reflect the topics associated with current items of user content. In some embodiments, the user profile may be updated to include any new topics associated with newly created user content at the time the user content is created, or on a periodical basis, such as daily, weekly etc. In this way, the user profile, and consequently the metadata on which the file system is based, dynamically reflects the user content. A user's view of the file system 100 is also updated with any changes to the metadata.

Figure 3:
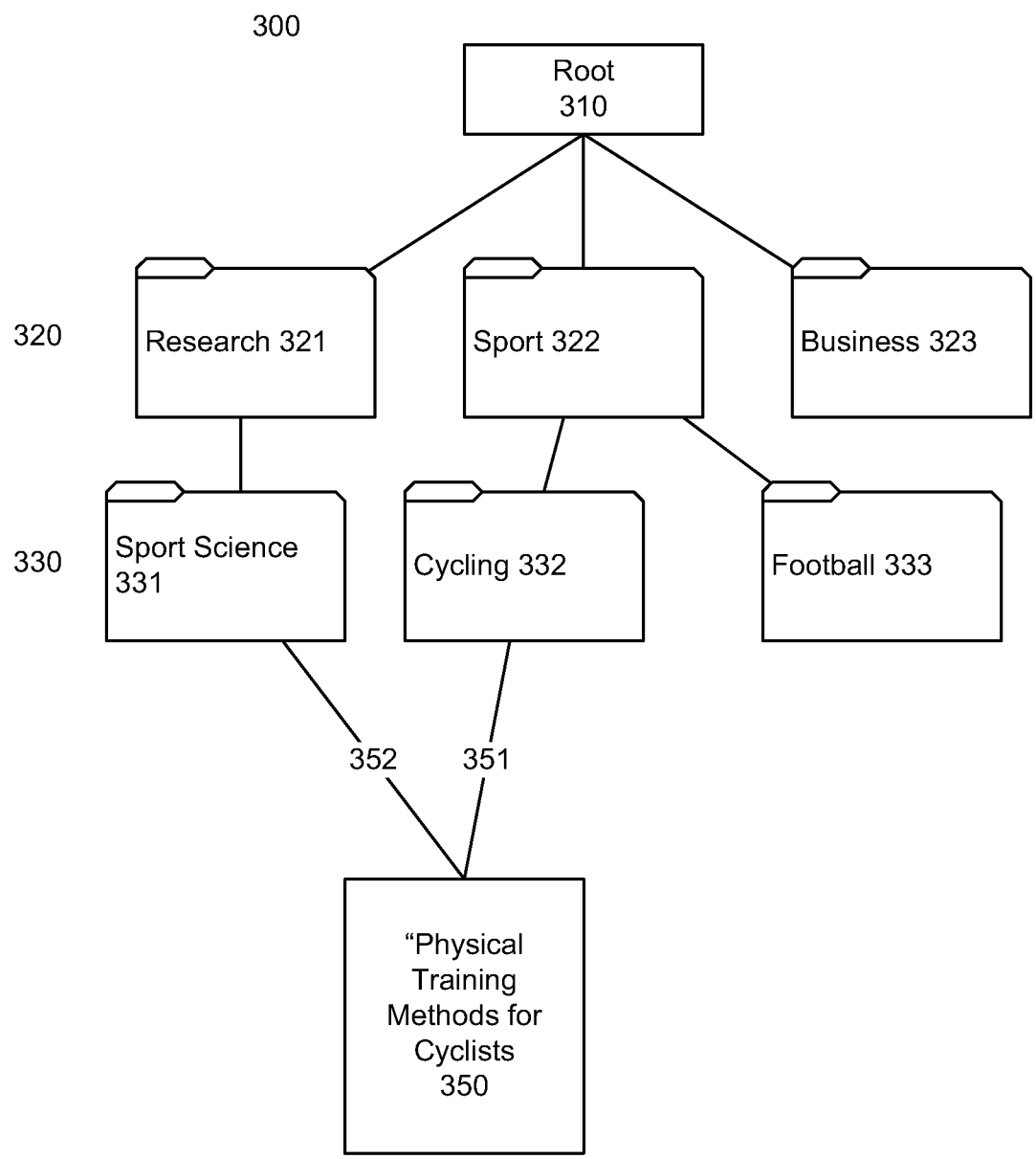
FIG. 3 shows an example folder structure created by an embodiment of the invention.

FIG. 3 illustrates a file system folder structure 300 corresponding to an example hierarchical user profile. The folder structure 300 comprises a root folder 310, a first level 320 of sub-folders and a second level 330 of sub-folders. It will be realised, however, that the folder structure 300 may comprise any number of folder levels. The first level 320 of sub-folders, which are visible from the root folder 310, comprises three folders named "Research" 321, "Sport" 322, "Business" 323 and form a first level of topics in the hierarchical user profile corresponding to general areas of the user's interests. The second level of folders 330 represents sub-topics of the general topics in the hierarchical user profile. In the exemplary folder structure, the second level 330 of folders comprises folders entitled "Sport Science" 331 which is under the folder "Research" 321, "Cycling" 332 and "Football" 333 under the folder "Sport" 322. Thus it will be understood that each layer in the hierarchical user profile corresponds to a set of folders at that level in the file system 300 and that dependencies in the user profile indicate which folders resided within other folders.

Referring again to FIG. 2, in step 230 user content is mapped to folders of the file system 100. The mapping may be performed by the document mapping component 140 of the PFS module 120. The mapping relates user content, such as documents, to one or more folders in the file system 300, such that when a user navigates through the file system 300 the documents mapped to each folder appear as though they are stored in the respective one or more folders. It will be noted, however, that a physical storage location of the documents is not altered by the mapping.

FIG. 3 includes example user content in the form of a document 350 entitled "Physical Training Methods for Cyclists". The mapping component 140 creates a first mapping 351 of the document 350 to the folder "\Sport\Cycling\" 332 in the file system 300 and a second mapping 351 of the document 350 to the folder "\Research\Sport Science\" 331. The mapping of the document to two folders 331, 332 is due to the document being related to two areas of interest to the user. Thus when the user navigates to both folders 331, 332 in the file system the same document is present in each folder. It will be noted that the mapping is not limited to documents. User content of various forms may be mapped to the folders, such as web pages, emails, bookmarks etc., such that the user content appears to be stored in the respective folders. As noted above, due to the virtual nature of the file system 100, the physical storage location of each item of user content need not be changed as the file system 100 merely provides a virtual directory structure through which to access the user content.

Once the metadata on which the virtual file system is based has been created, for example by the method of FIG. 2, it may be acted on via the WebDAV server 110. For example, when the WebDAV server 110 receives a PROPFIND method on a root folder of the file system 100, the WebDAV server 110 requests the PFS module 120 to provide file system metadata indicating the folders and user content in the root folder. The WebDAV server 110 then formulates a response for the PROPFIND method based upon the file system metadata.

Some embodiments of the file system 100 also allow a user to create a new folder at an appropriate place in the file system i.e. at a location specified by the user, which in turn may impact and adjust the automatically determined user profile. For example, the user may create a new folder named "Mountain Biking" under \Sport\Cycling. The creation of the new folder is communicated to the PFS module 120 by the WebDAV server 110 and the PFS module 120 inserts a corresponding new topic into the user profile. Furthermore, some embodiments of the file system 100 support user-specified moving of files between folders which will in turn impact and adjust the user content mapping. For example, a user can move or copy a document from one folder to another e.g. via WebDAV methods MKCOL, MOVE or COPY. The moving or copying of the document is communicated from the WebDAV server 110 to the PFS module 120 which stores information indicating the move or copy operation in the document mapping component 140.

As noted above, the file system 100 automatically creates a folder structure according to the user's interests. However, it is to be expected that the user's interests will evolve over time, such that a folder hierarchy created at a particular time will not be entirely relevant or suitable for that user a later point in time. Therefore, the method of FIG. 2 may be repeated periodically to dynamically update the user profile and consequently adapt the file system to the user's changing interests and knowledge. Changes to the user profile are primarily caused by users adding or deleting user content. The user profile hierarchy may also change based on whether a topic still matches the threshold factor determined with respect to current user content.

Some embodiments of the invention allow integration of user content from other sources within the file system 300. In particular, some embodiments allow another user's content (a second user) to be integrated within the virtual file system 300 of a first user as though the second user's content belongs to the first user. Advantageously, this allows a plurality of users to share content with the content being presented to each user in an organised folder structure.

The file system sharing component 150 is able to store identification information of one or other computer systems supporting a virtual file system 100 according to an embodiment of the invention. The file system sharing component 150 may store a network address, such as an IP address of one or more devices supporting a virtual file system 100. For example, an identified device may be a computer belonging to a friend of the first user. Providing that the user's friend has agreed to export at least a part of their user content, the shared content is integrated into the virtual file system 100 of the first user.

In some embodiments of the invention, integration of folders of first and second user's virtual file systems is based upon a similarity analysis. In particular, in some embodiments, a similarity measure determined based upon a bipartite graph derived from the hierarchical user profiles of the first and second users. "Computing Semantic Similarity Using Ontologies" by R. Thiagarajan, G. Manjunath and M. Stumptner, HPLabs Tech Report, HPL-2008-87, which is herein incorporated by reference, discloses similarity computation measures which utilise spreading as a means to capture the semantics of entity descriptions and may be used in embodiments of the invention to compute a similarity value between the hierarchical user profiles of a plurality of users by the file system sharing component 150.

Figure 4:
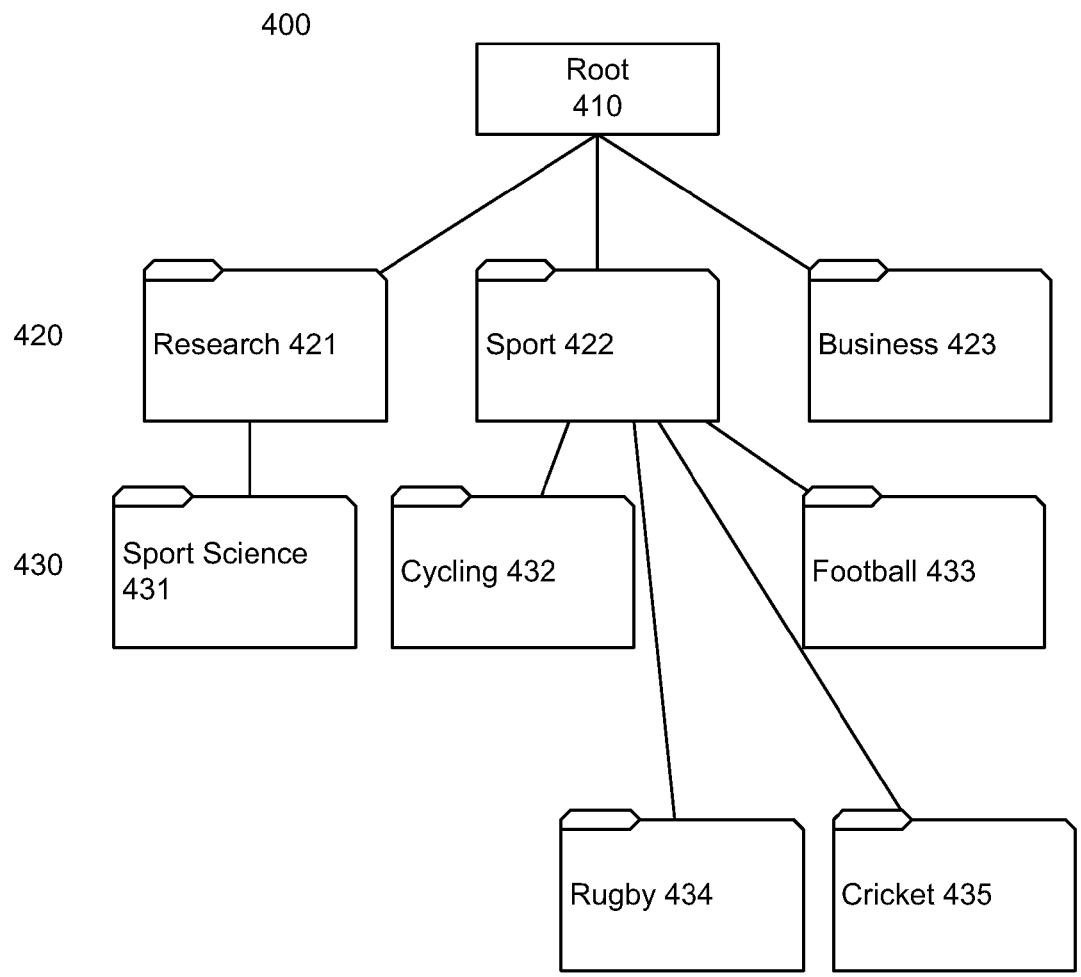
FIG. 4 shows a further example folder structure created by an embodiment of the invention.

FIG. 4 shows another example file system folder structure 400, based upon that shown in FIG. 3. The folders of the first user include a root folder 410, a first level 420 of sub-folders having three folders named "Research" 421, "Sport" 422, "Business" 423 and a second level 430 of sub-folders having folders "Sport Science" 431 under the folder "Research" 421, "Cycling" 432 and "Football" 433 under the first level folder "Sport" 422. The folders of the first user's file system 400 have been integrated with shared folders 434, 435 of the second user's file system. The shared folders 434, 435 relating to "Rugby" and "Cricket" have been determined to be similar to be similar to the folders "Cycling" 432 and "Football" 433 of the first user. In some embodiments, the folders of the second user may be indentified within the folder structure 400 of the first user as originating from the second user. For example, folders 434, 435 may be identified using a name of the second user owning the folders e.g. as "David's Rugby Folder". The first user may access the folders 434, 435 of the second user integrated within the folders of their own automatically generated folder hierarchy.

It will be realised that embodiments of the present invention ease the management and organisation of user content, such as documents. A folder structure is automatically created based upon user content. Furthermore, in some embodiments, the folder structure is able to evolve with a user's changing interests or knowledge. Some embodiments of the invention allow user content of two or more users to be integrated.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method performed by a computer system, comprising:
   determining, for each item of user content stored on one or more storage devices, one or more topics from a reference set of topics obtained from a knowledge repository using the computer system;
   forming a hierarchical user profile from the determined topics using the computer system;
   determining a first file system folder structure based upon the hierarchical user profile using the computer system; and
   mapping the user content to one or more folders of the first file system folder structure using the computer system.

2. The method of claim 1, further comprising:
   mapping the user content to the one or more folders of the file system based upon the one or more topics associated with each item of the user content using the computer system.

3. The method of claim 1, further comprising:
   integrating a second file system folder structure with the first file system folder structure using the computer system.

4. The method of claim 3, further comprising:
   determining a similarity between folders of the second file system folder structure and the folders of the first file system using the computer system; and arranging the folders of the second file system folder structure at locations determined according to the similarity using the computer system.

5. The method of claim 1, further comprising:
dynamically updating the first file system folder structure according to the user content using the computer system.

6. A method of creating a folder structure of a file system with a computer system, comprising:
determining, based upon a first plurality of items of first user content, a user profile indicating one or more topics from a reference set of topics obtained from a knowledge repository using the computer system;
determining a first folder structure of a personal file system based upon the user profile such that each folder in the first folder structure represents one of the determined topics using the computer system; and
associating each of the first plurality of items of the first user content with one or more of the folders of the first folder structure using the computer system.

7. The method of claim 6, comprising:
analyzing the first plurality of items of the first user content to determine the topics associated with the first user content using the computer system.

8. The method of claim 6, wherein each of the first plurality of items of the first user content is compared against an index of the reference set of topics to determine the one or more topics relevant to each of the first plurality of items of the first user content.

9. The method of claim 8, wherein the user profile is a hierarchical user profile based upon frequently occurring topics associated with the first plurality of items of the first user content.

10. The method of claim 6, further comprising;
integrating a second folder structure based upon a second plurality of items of second user content with the first folder structure by determining a similarity between the folders in the first folder structure and folders in the second folder structure using the computer system.

11. The method of claim 6, further comprising;
dynamically updating the first folder structure based upon the first user content using the computer system.

12. A non-transitory computer-readable medium having computer-executable instructions stored thereon which, when executed by a computer, perform a method comprising:
determining, for each item of user content stored on one or more storage devices, one or more topics from a reference set of topics obtained from a knowledge repository;
forming a hierarchical user profile from the determined topics;
determining a first file system folder structure based upon the hierarchical user profile; and
mapping the user content to one or more folders of the first file system folder structure.

* * * * *

UNITED STATES PATENT AND TRADEMARK OFFICE
CERTIFICATE OF CORRECTION

PATENT NO. : 9,256,608 B2  
APPLICATION NO. : 12/720689  
DATED : February 9, 2016  
INVENTOR(S) : Geetha Manjunath et al.

Page 1 of 1

It is certified that error appears in the above-identified patent and that said Letters Patent is hereby corrected as shown below:

In the Claims

In column 8, line 5, in Claim 10, delete "comprising;" and insert -- comprising: --, therefor.

In column 8, line 11, in Claim 11, delete "comprising;" and insert -- comprising: --, therefor.

Signed and Sealed this  
Nineteenth Day of July, 2016

Michelle K. Lee  
*Director of the United States Patent and Trademark Office*